United States Patent [19]

Scott

[11] 4,365,978
[45] Dec. 28, 1982

[54] STORAGE OF LIQUID HYDROCARBONS IN SALT DOME CAVERNS

[75] Inventor: Paul R. Scott, Brazoria, Tex.

[73] Assignee: Shell Oil Company, Houston, Tex.

[21] Appl. No.: 261,406

[22] Filed: May 7, 1981

Related U.S. Application Data

[63] Continuation-in-part of Ser. No. 133,755, Mar. 25, 1980, abandoned.

[51] Int. Cl.³ .................... B01D 19/00; E02D 27/00
[52] U.S. Cl. .......................................... 55/47; 55/53; 405/59
[58] Field of Search ................. 55/36, 46, 47, 53, 54, 55/196, 198; 405/53, 55, 59

[56] References Cited

U.S. PATENT DOCUMENTS

| | | | |
|---|---|---|---|
| 1,249,232 | 12/1917 | Squires | 55/53 |
| 1,745,751 | 2/1930 | Folco | 55/46 X |
| 2,104,759 | 1/1938 | Randel | 55/53 |
| 2,341,197 | 2/1944 | Whiskopf | 91/46 |
| 3,083,537 | 4/1963 | Dougherty | 405/59 |
| 3,289,416 | 12/1966 | Varvel | 405/59 |
| 3,856,482 | 12/1974 | Fortune | 55/36 |
| 4,136,747 | 1/1979 | Mallory | 55/53 X |
| 4,266,950 | 5/1981 | Makino | 55/196 |

Primary Examiner—John Adee

[57] ABSTRACT

Liquid hydrocarbons are stored in salt dome caverns containing brine after first stripping the brine of contaminating gases such as oxygen and carbon dioxide by sparging a decontaminating gas such as nitrogen into the brine and removing the nitrogen and the contaminating gases from the salt dome cavern.

9 Claims, 1 Drawing Figure

SCHEMATIC DEPICTING THE USE OF NITROGEN TO DECONTAMINATE BRINE IN A SALT CAVERN

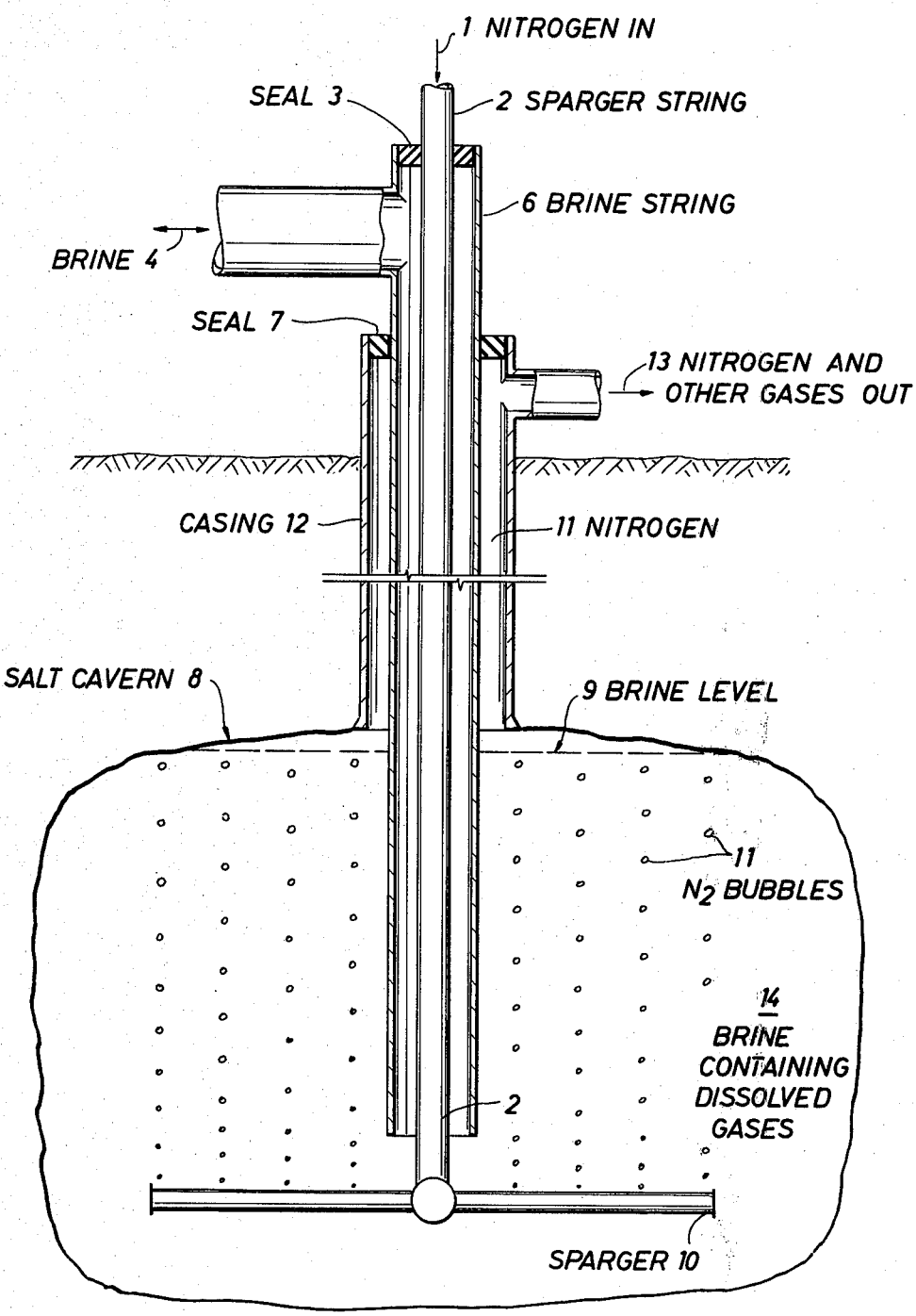
FIG. 1 SCHEMATIC DEPICTING THE USE OF NITROGEN TO DECONTAMINATE BRINE IN A SALT CAVERN

STORAGE OF LIQUID HYDROCARBONS IN SALT DOME CAVERNS

CROSS-REFERENCE TO RELATED APPLICATION

This application is a construction-in-part of application Ser. No. 133,755 filed Mar. 25, 1980, now abandoned. The disclosure of that application is incorporated herein by cross-reference.

BACKGROUND OF THE INVENTION

Large caverns are solution-mined in salt formations and subsequently used for the storage of hydrocarbons such as petroleum and petroleum products. Caverns in salt domes, usually known as wells or jugs, are routinely used for storing high vapor pressure, low molecular weight hydrocarbons such as ethane, ethylene, propane, propylene, and butane. The hydrocarbon is stored on top of brine in the well. When the hydrocarbon is transferred to the cavern, brine is displaced to an open pit. Brine is subsequently pumped from the pit into the well to displace and thereby recover the hydrocarbon.

Salt formations which are solution-mined to form caverns often contain large quantities of gases such as methane and ethane as well as carbon dioxide. When liberated by the dissolution of the salt, these gases dissolve in the brine. Further, when fresh waters from open reservoirs and streams are used to solution mine the salt, oxygen and nitrogen from the air dissolved in the fresh water are carried into the caverns and remain dissolved in the brine. Such contaminating gases ($O_2$, $CO_2$, $CH_4$, $C_2H_6$, etc.) are many times more soluble in stored liquid hydrocarbons such as ethylene, propylene, propane, etc., at well storage conditions than in brine. Thus, with long exposure times, large quantities of the gases in the brine are transferred to the stored hydrocarbon. Often the quantity of gases transferred is sufficient to exceed specifications for contaminating gases in the stored hydrocarbon. Reprocessing of the stored hydrocarbon is sometimes required to reduce the contaminating gases below specified amounts.

A process for removing contaminating gases from water in an underground cavern is disclosed in U.S. Pat. No. 3,289,416. The disclosed invention requires heating the water and stripping the heated water in a simple tower with a suitable stripping gas to remove the $CO_2$ and $O_2$ which normally would be liberated at that temperature and a portion of the remaining dissolved $CO_2$ and $O_2$, depending upon the efficiency of the column. This process, however, is relatively inefficient compared to the present invention, as explained hereinafter.

Other patents considered pertinent to the present invention include U.S. Pat. Nos. 3,083,537; 2,104,759; and 3,856,482.

SUMMARY OF THE INVENTION

The present invention pertains to a process for storing a liquefied gas such as a hydrocarbon over a liquid such as water or brine in an underground cavern such as a salt dome cavern. Before admitting the liquefied gas to the cavern, the liquid such as brine is treated to remove contaminating gases therefrom. The contaminating gas (e.g. $O_2$, $CO_2$, $CH_4$, $C_2H_6$, etc.) preferably is removed by sparging (i.e., bubbling a gas through the liquid in the cavern). The sparging gas preferably is nitrogen although another gas such as methane (if it is a non-contaminant) may be utilized, or even some of the gas which is to be stored over the brine or other liquid. Nitrogen gas is preferred inasmuch as it is readily available, performs exceptionally well in removing most contaminating gases from the brine or other liquid and can be released safely to the atmosphere. Thus, as a nitrogen bubble passes through the brine, the contaminating gases pass from the brine into the nitrogen in the bubble in an attempt to establish equilibrium with respect to their partial pressures in the two phases. When a bubble of nitrogen leaves the brine at the top of the well and is recovered or released (e.g. to the atmosphere), the contaminating gas is removed from the system. Accordingly, a principal improvement of the present invention is the utilization of a sparging technique to decontaminate a brine or other liquid in situ in an underground cavern.

DESCRIPTION OF THE DRAWING

FIG. 1 is a schematic depiction of the use of nitrogen to decontaminate brine in a salt cavern.

DESCRIPTION OF PREFERRED EMBODIMENTS

FIG. 1 shows the use of nitrogen (or another gas such as methane) to decontaminate brine (or another liquid such as water) in a salt dome cavern (or other underground cavern). The nitrogen 1 is admitted (at a pressure of about 20 to 1000 psig and temperature of about 30° to 140° F.) through a sparger string 2 passing through a seal 3. Brine 4 is passed through a brine string 6 and a seal 7. Sparger string 2 extends downwardly into a salt dome cavern 8 having a brine level 9. Typically, the brine 14 (or other liquid) is at a temperature of 75° to 140° F. Sparger string 2 connects with sparger 10 close to the bottom of cavern 8 and releases bubbles 11 which pass upwardly in the brine, out of the cavern via casing 12 and then to atmosphere or recovery via conduit 13. Gas bubbles tend to spread and swirl and mix thoroughly with the brine in every part of the cavern. When brine is pumped out for degassing as is the case with the invention of U.S. Pat. No. 3,289,416 cited above, a thorough mixing action is not readily obtained, and the brine in the remote areas of the cavern can only be thoroughly reached after extensive pumping. About 75% of the contaminating gases are removed from a salt dome is one week by the present invention. By comparison, approximately three months of pumping at normal rates as practiced in the art are required to remove 75% of the gases by a process such as that in U.S. Pat. No. 3,289,416.

The dispersing of gas in the liquid brine is preferably accomplished by sparging through simple bubblers such as an open-end standpipe, a horizontal perforated pipe, or a perforated plate at the bottom of the cavern. Although the size of the bubbles will be a function of the discharge pressure and of the diameter of the orifice through which the gas is introduced at low rates, at ordinary gassing rates relatively large bubbles will be produced regardless of the size of the orifice. Perforated pipes or plate spargers usually have orifices $\frac{1}{8}$ to $\frac{1}{2}$-inch in diameter. A perforated pipe sparger is designed so that the pressure drop across the individual orifices is large compared with the pressure drop down the length of the pipe; otherwise the orifices most remote from the gas supply may not function. Porous septa in the form of plates, tubes, discs, or other shapes may be utilized instead of simple bubblers and are made by bonding together carefully sized particles of carbon, ceramics or metal. The resulting septa may be used as spargers to produce much smaller and more efficient bubbles than will result from a simple bubbler. The size of the bubbles formed is proportional not only to the pore diameter but also to the pressure drop across the septum. At high gas rates, coalescence occurs on the surface of the septum, and poor gas dispersion results.

EXAMPLE

After completing the solution mining of a well in a salt formation, the well is full of fresh brine which contains large quantities of oxygen, carbon dioxide, methane, ethane, etc. The quantities of these gases are reduced as follows:

(1) a pipe equipped with a folding sparger or a nozzle is lowered through a brine string to near the bottom of the well (for most applications this can be a nominal 2-inch pipe);

(2) after passing from the brine string near the bottom of the cavern, the sparger arms are released to assume a horizontal position;

(3) pressurized nitrogen is forced into the annulus (brine string-casing) to displace about 500 barrels of brine from the annulus and the cavern;

(4) preferably, pressure on the nitrogen in the dome cavern above brine level 9 is reduced, more preferably to a pressure no lower than atmospheric pressure;

(5) cryogenic nitrogen is heated and forced to the bottom of the cavern utilizing the sparger piping;

(6) the nitrogen, as bubbles, passes up through the brine in the well and out of the well through the conduit normally used to transfer a liquid hydrocarbon (for storage) to and from the cavern;

(7) upon passing through the brine, contaminating gases, by diffusion, are transferred from the brine to the nitrogen in the bubble;

(8) upon reaching the atmosphere, nitrogen containing the contaminants is released or processed to remove the contaminating gas;

(9) nitrogen is added until an analysis of the exiting nitrogen approaches the desired content of contaminated gases;

(10) the pipe and sparger are removed from the brine string;

(11) brine is added through the brine string to displace the nitrogen from the top of the cavern and tubing.

What is claimed is:

1. A process for decontaminating water in an underground cavern, said water containing at least one contaminating gas from the group consisting of oxygen and carbon dioxide, comprising bubbling a decontaminating gas into the water to displace some of the water from the cavern, reducing the pressure of the decontaminating gas filling the volume left above the water, allowing the contaminating gas to pass from the water into the decontaminating gas and passing the decontaminating gas and contaminating gas out of the underground cavern.

2. The process of claim 1 wherein the underground cavern is formed by solution mining.

3. The process of claim 1 wherein the water is brine.

4. The process of claim 1 wherein a liquid hydrocarbon is stored over the decontaminated water.

5. The process of claim 1 wherein the decontaminating gas is bubbled into the cavern via a sparger.

6. The process of claim 1 wherein the decontaminating gas and contaminating gas are passed to a separation process, and at least one of the gases is recovered.

7. The process of claim 1 wherein the decontaminating gas is added to the underground cavern until the analysis of the exiting decontaminating gas approaches the desired content of contaminating gas.

8. The process of claim 1 wherein the decontaminating gas is bubbled into the cavern via a porous septum.

9. The process of claim 1 wherein the decontaminating gas is nitrogen.

* * * * *